United States Patent
Plüss et al.

(10) Patent No.: US 10,089,807 B2
(45) Date of Patent: Oct. 2, 2018

(54) ELECTRONIC ACCESS CONTROL DEVICE AND ACCESS CONTROL METHOD

(71) Applicant: LEGIC IDENTSYSTEMS AG, Wetzikon (CH)

(72) Inventors: Marcel Plüss, Tann (CH); Paul Studerus, Oberweningen (CH)

(73) Assignee: LEGIC IDENTSYSTEMS AG (CH)

( * ) Notice: Subject to any disclaimer, the term of this patent is extended or adjusted under 35 U.S.C. 154(b) by 0 days.

(21) Appl. No.: 15/321,094

(22) PCT Filed: Jun. 18, 2015

(86) PCT No.: PCT/EP2015/001232
§ 371 (c)(1),
(2) Date: Dec. 21, 2016

(87) PCT Pub. No.: WO2015/197178
PCT Pub. Date: Dec. 30, 2015

(65) Prior Publication Data
US 2017/0140592 A1    May 18, 2017

(30) Foreign Application Priority Data

Jun. 23, 2014 (CH) ........................................ 951/14

(51) Int. Cl.
*G07C 9/00* (2006.01)
(52) U.S. Cl.
CPC ..... *G07C 9/00309* (2013.01); *G07C 9/00563* (2013.01); *G07C 2009/00317* (2013.01); *G07C 2009/00793* (2013.01)
(58) Field of Classification Search
CPC ...... G07C 9/00309; G07C 2009/00317; G07C 2009/00793; G07C 9/00563
(Continued)

(56) References Cited

U.S. PATENT DOCUMENTS

2003/0027526 A1    2/2003    Hillyard
2008/0014867 A1    1/2008    Finn
(Continued)

FOREIGN PATENT DOCUMENTS

EP    1 471 426          10/2004
EP    1 723 575 B1       10/2011
(Continued)

OTHER PUBLICATIONS

International Search Report dated Aug. 26, 2015 issued in corresponding International patent application No. PCT/EP2015/001232.
(Continued)

*Primary Examiner* — Hirdepal Singh
(74) *Attorney, Agent, or Firm* — Ostrolenk Faber LLP (57) ABSTRACT

An electronic access control device (1) includes a radio communication module (11) for wireless data exchange in a first radio frequency band with a mobile device (2) over a direct wireless communication link (3). The access control device has a controller (12) connected to the wireless radio communication module for generating an access control signal using an access key received from the mobile device. The electronic access control device further includes a proximity detector (13) for detecting a mobile device in defined proximity (P), using a radio frequency in a second radio frequency band, different from the first radio frequency band. The controller is connected to the proximity detector and controls the radio communication module to establish the direct wireless communication link with the mobile device, only if the mobile device is detected in defined proximity of the electronic access control device.

16 Claims, 4 Drawing Sheets

(58) Field of Classification Search
USPC .......................................................... 340/5.61
See application file for complete search history.

(56) References Cited

U.S. PATENT DOCUMENTS

| | | | |
|---|---|---|---|
| 2009/0184801 A1* | 7/2009 | Bliding | E05B 49/00 340/5.61 |
| 2010/0148921 A1 | 6/2010 | Bliding | |
| 2011/0006879 A1 | 1/2011 | Lambrou et al. | |
| 2012/0154115 A1 | 6/2012 | Herrala | |
| 2012/0280783 A1 | 11/2012 | Gerhardt et al. | |
| 2013/0335193 A1 | 12/2013 | Hanson et al. | |
| 2014/0049361 A1 | 2/2014 | Ahearn et al. | |
| 2014/0077929 A1* | 3/2014 | Dumas | G07C 9/00571 340/5.61 |
| 2014/0292481 A1 | 10/2014 | Dumas | |
| 2015/0119019 A1* | 4/2015 | Minichmayr | G07C 9/00571 455/420 |
| 2015/0185314 A1 | 7/2015 | Corcos | |
| 2015/0356848 A1 | 12/2015 | Hatch | |
| 2015/0363986 A1* | 12/2015 | Hoyos | G07C 9/00563 340/5.61 |
| 2016/0180618 A1* | 6/2016 | Ho | G07C 9/00563 340/5.52 |
| 2016/0358397 A1* | 12/2016 | Kristensen | G07C 9/00309 |
| 2016/0368455 A1* | 12/2016 | Kim | B60R 25/25 |
| 2017/0093836 A1* | 3/2017 | Neafsey | H04L 63/08 |
| 2017/0287248 A1* | 10/2017 | Aase | G07C 9/00857 |
| 2018/0081335 A1* | 3/2018 | Davis | G07C 9/00309 |

FOREIGN PATENT DOCUMENTS

| | | |
|---|---|---|
| EP | 2 437 403 A1 | 4/2012 |
| FR | 2 981 823 A1 | 4/2013 |
| WO | WO 2005/086069 | 9/2005 |
| WO | WO 2006/098690 | 9/2006 |
| WO | WO 2013/181682 A1 | 12/2013 |

OTHER PUBLICATIONS

Written Opinion dated Aug. 26 2015 issued in corresponding International patent application No. PCT/EP2015/001232.
International Search Report dated Aug. 7, 2015 issued in International patent application No. PCT/EP2015/001233.
Written Opinion dated Aug. 7, 2015 issued in International patent application No. PCT/EP2015/001233.
International Search Report dated Aug. 26, 2015 issued in International patent application No. PCT/EP2015/001231.
Written Opinion dated Aug. 26, 2015 issued in International patent application No. PCT/EP2015/001231.

* cited by examiner

ELECTRONIC ACCESS CONTROL DEVICE AND ACCESS CONTROL METHOD

CROSS REFERENCE TO RELATED APPLICATIONS

The present application is a 35 U.S.C. § 371 National Phase conversion of PCT/EP2015/001232, filed Jun. 18, 2015, which claims the benefit of Swiss patent application no. 00951/14, filed Jun. 23, 2014, the disclosure of which are incorporated herein by reference. The PCT International Application was published in the English language.

FIELD OF THE INVENTION

The present invention relates to an electronic access control device and an access control method. Specifically, the present invention relates to an electronic access control device comprising a radio communication module for a direct wireless data exchange with a mobile device, and a controller connected to the wireless radio communication module for generating an access control signal using an access key received from the mobile device.

BACKGROUND OF THE INVENTION

For many years, access control systems have been used in connection with passive RFID transponders (Radio Frequency Identifier). These access control systems included RFID readers for reading in a wireless fashion access rights or at least user identifiers from RFID transponders to control access to an access controlled area, such as a building or a room, or to access controlled objects, such as goods in a vending machine, etc. With the arrival of mobile radio phones (cellular phones) that included active RFID-based communication interfaces, so called NFC interfaces (Near Field Communication), it became possible to use such mobile phones as carrier of access rights rather than passive RFID transponders in form of RFID cards, dongles, or the like. With an NFC interface, it is possible to tie access control to the physical presence of the mobile phone in an area that is near a corresponding NFC interface of an access control device, e.g. attached to or close to a door or a gate. In other words, the short communication range of NFC interfaces requires that a user's mobile phone does not have to great a distance from the door or gate that is to be accessed, making it unlikely that an unauthorized person gets given access erroneously on the basis of access rights stored on the rightful user's mobile phone, as long as the mobile phone is in the possession of the rightful user. However, not all types and brands of mobile phones are equipped with an NFC interface or other RFID-based communication capabilities. Nevertheless, in addition to the mobile radio communication modules used for accessing cellular telephone networks such as GSM (Global System for Mobile Communication) or UMTS (Universal Mobile Telephone System), some types and brands of mobile phones include other radio-based communication modules for establishing local or direct wireless communication links. For example, such radio-based communication modules include WLAN (Wireless Local Area Network) and Bluetooth communication interfaces which have a much larger communication range than NFC interfaces, e.g. ten to a hundred meters. Although such other radio-based communication modules could be used for exchanging access rights with an access control device, there is a risk that an unauthorized user could get erroneous access, only because the rightful user or at least his mobile phone is located within this extended communication range of the access control device.

FR 2981823 describes a method for authenticating identification device with respect to an actuator device integrated in car for carrying out car a start-up operation. In an authentication session, the identification device us authenticated by exchanging authentication data between the identification device and the actuator device. During an authentication session, a first part of the exchanging authentication data is communicated using Bluetooth, while a second part of the authentication data is exchanged through magnetic induction. In the actuator the two parts of authentication data are aggregated.

US 2012/154115 describes a method for controlling access in a location tracking system. When a mobile tag enters a room, it carries out location update procedures and becomes linked to a node of the location tracking system and updates its location in the room. In response to the location update, a location tracking apparatus of the location tracking system transmits an activation signal to an access control apparatus in the room to initiate establishment of a communication connection with the mobile tag so as to negotiate about access rights of the mobile tag. In an embodiment, the access control apparatus may be provided with a proximity sensor which, subsequently to negotiating the access rights, detects the close proximity of the mobile tag, before the access control apparatus actually grants or denies access.

US 2014/049361 describes an electronic system which includes a mobile device that communicates with a reader device associated with an electronic lock. The mobile device and the reader device communicate with each other, e.g. via Bluetooth, and exchange credentials, secure data, and location information. In an embodiment, the electronic lock may also include a close proximity range capability which automatically unlocks the electronic lock when a mobile device with appropriate credentials is within the close proximity range.

SUMMARY OF THE INVENTION

It is an object of this invention to provide an electronic access control device and an access control method that do not have at least some of the disadvantages of the prior art. In particular, it is an object of the present invention to provide an electronic access control device and an access control method which are not limited to mobile devices with an NFC interface, but nonetheless share at least some of the advantages of NFC based access control.

According to the present invention, these objects are achieved through the features of the independent claims. In addition, further advantageous embodiments follow from the dependent claims and the description.

An electronic access control device comprises a radio communication module configured to perform a wireless data exchange with a mobile device over a direct wireless communication link between the radio communication module and the mobile device.

According to the present invention, the above-mentioned objects are particularly achieved in that the electronic access control device further comprises an access confirmation module, stored in the electronic access control device. The access confirmation module is executable on a processor of the mobile device and configured to control the processor of the mobile device to receive from a user of the mobile device a confirmation instruction and, responsive to the confirmation instruction, to transmit to the radio communication module of the access control device a confirmation message. The electronic access control device further comprises a controller connected to the radio communication module and configured to control the radio communication module to transmit the access confirmation module via the direct wireless communication link to the mobile device. The controller is further configured, upon reception of a confirmation message from the mobile device via the direct wireless communication link, to generate an access control signal.

In an embodiment, the access confirmation module is further configured to control the processor of the mobile device to include in the confirmation message an access key, and the controller is further configured to generate the access control signal using the access key included in the confirmation message.

In an embodiment, the controller is further configured to check whether a signal strength of the mobile device is above a signal strength threshold indicative of the mobile device being located within a defined close range of distance from the access control device, and to transfer the access confirmation module via the direct wireless communication link to the mobile device, if the signal strength of the mobile device is above the signal strength threshold.

In a further embodiment, the controller is further configured to control the radio communication module to transmit to the mobile device the executable access confirmation module configured to control the processor of the mobile device to receive the confirmation instruction from the user of the mobile device through a finger print sensor of the mobile device and/or a graphical user interface of the mobile device.

In an embodiment, the controller is further configured to control the radio communication module to transmit to the mobile device the executable access confirmation module configured to control the processor of the mobile device to verify authorization information entered by the user and/or to verify a finger print entered by the user through a finger print sensor of the mobile device, and, upon affirmative verification, to generate an affirmative confirmation message which includes the access key.

In another embodiment, the radio communication module is configured to perform the wireless data exchange with the mobile device in a first radio frequency band and the electronic access control device further comprises a proximity detector configured to detect a presence of the mobile device in defined proximity of the electronic access control device using a radio frequency in a second radio frequency band, different from the first radio frequency band. The controller is connected to the proximity detector and further configured to control the radio communication module to establish the direct wireless communication link with the mobile device, upon detection of the mobile device by the proximity detector in the defined proximity of the electronic access control device.

In a further embodiment, the radio communication module is configured to perform the wireless data exchange with the mobile device over a short distance communication link of several meters, particularly over a distance of up to ten meters, and the proximity detector is configured to detect the presence of the mobile device in close proximity of the electronic access control device of a few centimeters, particularly within a distance of up to ten centimeters.

In an embodiment, the proximity detector comprises an RFID reader and is configured to detect the presence of the mobile device by emitting an electromagnetic field pulse, detecting a return signal during emission of the electromagnetic field pulse, and using the return signal to detect the presence of the mobile device.

In an embodiment, the radio communication module comprises a Bluetooth transceiver, and the controller is further configured to control the Bluetooth transceiver to establish the direct wireless communication link with the mobile device by performing a Bluetooth connection process. For example, the radio communication module comprises a Bluetooth Low Energy transceiver.

In another embodiment, the access control device further comprises an electronic lock, and the controller is connected to the electronic lock and further configured to supply the access control signal to the electronic lock for controlling the electronic lock to perform an unlock function.

In addition to the electronic access control device, the present invention also relates to a mobile device which comprises a radio communication module configured to perform a wireless data exchange with an access control device over a direct wireless communication link between the radio communication module and the access control device. The mobile device further comprises a processor connected to the radio communication module and configured to control the radio communication module to receive from the access control device an executable access confirmation module via the direct wireless communication link, to execute the access confirmation module. By executing the access confirmation module, the processor of the mobile device receives from a user of the mobile device a confirmation instruction and, responsive to the confirmation instruction, transmits a confirmation message via the direct wireless communication link to the access control device. The confirmation message enables the access control device to generate an access control signal. In an embodiment, the access confirmation module is further configured to control the processor of the mobile device to include in the confirmation message an access key, enabling the access control device to generate an access control signal using the access key included in the confirmation message.

In addition to the electronic access control device, the present invention also relates to an access control method. The access control method comprises controlling by a controller of an electronic access control device a radio communication module of the electronic access control device to establish a direct wireless communication link with a mobile device for a wireless data exchange. The access control method further comprises transmitting an executable access confirmation module from the access control device via the direct wireless communication link to the mobile device. The access control method further comprises executing the executable access confirmation module by a processor of the mobile device. The executable access confirmation module controls the processor of the mobile device such that the processor receives from a user of the mobile device a confirmation instruction, and, responsive to the confirmation instruction, generates a confirmation message. The confirmation message includes an access key stored in the mobile device. The executable access confirmation module further controls the processor of the mobile device such that the processor transmits the confirmation message via the direct wireless communication link to the radio communication module of the access control device, thereby enabling the access control device to generate an access control signal using the access key.

In an embodiment, the method further comprises the access confirmation module controlling the processor of the mobile device such that the processor includes in the confirmation message an access key stored in the mobile device, enabling the access control device to generate the access control signal using the access key.

In an embodiment, the method further comprises the controller of the electronic access control device checking whether a signal strength of the mobile device is above a signal strength threshold indicative of the mobile device being located within a defined close range of distance from the access control device, and transferring the access confirmation module via the direct wireless communication link to the mobile device, if the signal strength of the mobile device is above the signal strength threshold. Depending on the embodiment and/or configuration, the signal strength of the mobile device is measured in the electronic access control device or the mobile device.

In another embodiment, the method further comprises detecting by a proximity detector of the electronic access control device a presence of the mobile device in defined proximity of the electronic access control device, using a radio frequency in a second radio frequency band. The controller of the electronic access control device controls the radio communication module of the electronic access control device to establish the direct wireless communication link (3) with the mobile device (2) in a first radio frequency band different than the second radio frequency band, upon detection of the mobile device (2) by the proximity detector (13) in the defined proximity (P) of the electronic access control device (1).

BRIEF DESCRIPTION OF THE DRAWINGS

The present invention will be explained in more detail, by way of example, with reference to the drawings in which.

DETAILED DESCRIPTION OF THE PREFERRED EMBODIMENTS

In FIGS. 1-5, reference numeral 1 refers to an electronic access control device. The electronic access control device 1 comprises one or more electronic circuits and modules powered by one or more batteries or an external power supply connected to the device.

Figure 1:
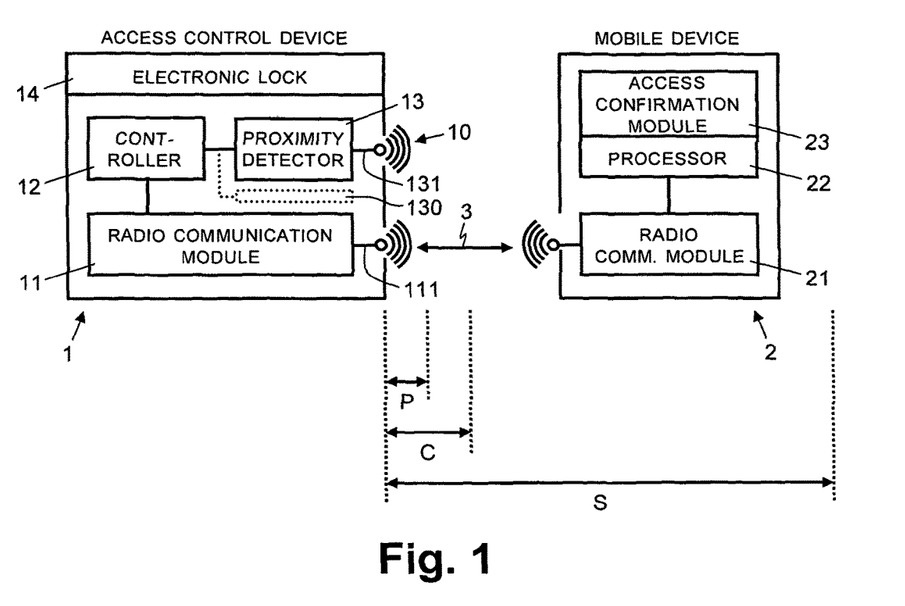
FIG. 1: shows a block diagram illustrating schematically an electronic access control device with a radio communication module and a radio based proximity detector.

As is illustrated schematically in the embodiment of FIG. 1, the electronic access control device 1 comprises an electronic/electric lock 14 for locking and unlocking an entrance, such as a door, a gate or the like, to an access controlled area, such as a building, a car, or a room. Responsive to an access control signal, the electronic lock 14 drives one or more bars or bolts to lock or unlock an entrance to the access controlled area. The electronic lock 14 is implemented together with the remaining components of the electronic access control device 1 in a common housing or in separate housings. One skilled in the art will understand that depending on the application, e.g. to control access to objects in a vending machine, the electronic access control device 1 or the electronic lock 14, respectively, are configured accordingly to block or grant access, e.g. to unlock or deliver objects in or from a vending machine.

In alternative embodiments, the electronic access control device 1 is not configured to lock and unlock an entrance but is configured to control user access to areas, objects, or services that traditionally required a ticket, e.g. public transportation, such as a train, tram, boat, ski lift, etc., or to events, such as performances in theatres, cinemas, sports arenas, etc., or access to objects supplied by a vending machine, such as a food, drink, or snack dispenser. Accordingly, a user's respective access rights are represented by an electronic (cryptographic) access key, an electronic ticket, and/or electronic funds or vouchers.

As is shown in FIG. 1, the electronic access control device 1 further comprises a radio communication module 11, a controller 12, and a radio based proximity detector 13. The controller is electrically connected to the communication module 11 and the radio based proximity detector 13.

The radio communication module 11 is configured to perform a wireless data exchange with a mobile device 2 over a direct wireless communication link 3 between the radio communication module 11 and the mobile device 2. The term "direct" is to indicate that the wireless communication link 3 includes no intermediate components, such as routers, repeaters, gateways, wire networks, base stations, etc., between the radio communication module 11 and the mobile device 2. The radio communication module 11 is configured to perform the wireless data exchange over a short distance S of several meters, particularly over a distance of up to five, ten, or twenty meters. In an embodiment, the radio communication module 11 comprises a Bluetooth transceiver, specifically a Low Energy Bluetooth transceiver. The radio communication module 11 is configured to operate in a frequency band from 2.4 to 2.485 GHz, using (Ultra High Frequency UHF) microwaves. In an alternative embodiment, the radio communication module 11 comprises a WLAN communication module based on IEEE 802.11 standards, e.g. operating in a frequency band from 2.4 GHz to 5 GHz.

The controller 12 comprises a programmable microprocessor with computer program code, a field programmable gate array, an application specific integrated circuit, and/or another electronic circuit configured to execute various functions, as described later in more detail.

The radio based proximity detector 13 is configured to detect the presence of a mobile device 2 in a defined proximity P of the electronic access control device 1, specifically, in close proximity P within a distance range of up to five, ten, or fifteen centimeters, e.g. adjustable by setting a sensitivity parameter in the access control device 1. The proximity detector 13 is configured to detect the presence of a mobile device 2 by emitting an electromagnetic field pulse 10, by detecting a return signal during emission of the electromagnetic field pulse 10, and using the return signal to detect the presence of the mobile device 2. Essentially, the proximity detector 13 is configured to detect the presence of a mobile device 2 by detecting a change in the electromagnetic field 10 emitted by the proximity detector 13 as caused by the presence of the mobile device 2. Specifically, the proximity detector 13 measures the return signal on the antenna 131 while it emits a defined electromagnetic field pulse 10, and determines in the return signal an attenuation, amplification, and/or shift in frequency as disclosed in patents EP 1 723 575 or EP 2 437 403 in the name of the applicant, the full contents of which being incorporated herein by reference. In an embodiment, the proximity detector 13 comprises an RFID reader (Radio Frequency Identifier), e.g. an RFID reader in accordance with ISO 18092, ISO 21481, ISO 15693, and/or ISO 14443. The proximity detector 13 is configured to operate at a carrier frequency of an RFID system, e.g. 6.78 MHz, 13.56 MHz, or 27.12 MHz (or another multiple of 13.56 MHz), using (High Frequency HF) radio waves.

Thus, the radio based proximity detector 13 uses a different, i.e. a lower, frequency band than the radio communication module 11. As is clearly shown in FIG. 1, the radio based proximity detector 13 and the radio communication module 11 are two distinct (radio based communication) modules of the access control device 1, each having its own transceiver circuit and its own antenna 111, 131. The radio based proximity detector 13 and the radio communication module 11 are two different and separate communication units, e.g. each implemented in a different integrated circuit (chip), and provide the access control device 2 with two different and separate communication channels.

The mobile device 2 is implemented as a mobile radio telephone (i.e. a cellular phone), a tablet or notebook computer, a computerized watch, or another mobile communication device. As illustrated schematically in FIG. 1, the mobile device 2 comprises a radio communication module 21 and a programmable processor 22 connected thereto. The radio communication module 21 is configured to exchange data with the radio communication module 11 of the access control device 1 via the direct wireless communication link 3.

Figure 2:
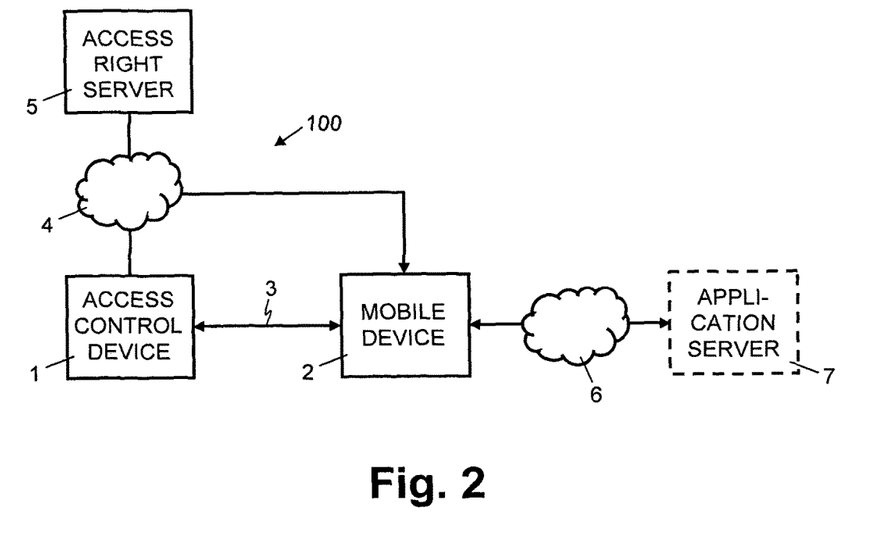
FIG. 2: shows a block diagram illustrating schematically an access control system with an electronic access control device, an access rights server, and mobile device.

As shown in FIG. 2, the access control system 100 comprises one or more electronic access control devices 1 and an access rights server 5 connected to the electronic access control devices 1 via a communication network 4. Depending on the implementation, the communication network 4 includes a LAN (Local Area Network), another wired network, a WLAN (Wireless LAN), and/or another mobile radio network, such as a GSM (Global System for Mobile communication) or a UMTS network (Universal Mobile Telephone System), and may include the Internet.

The access rights server 5 comprises one or more operable computers with one or more processors configured to transmit to the mobile devices 2 access keys and to transmit to the electronic access control devices 1 access keys and/or decryption keys. In an embodiment, the access rights server 5 or its computers/processors, respectively, are further configured to transmit to the mobile devices 2 and/or the electronic access control devices 1 an executable access confirmation module 23. Alternatively, the executable access confirmation module 23 is transmitted to the mobile devices 2 by an application server 7 via a telecommunications network 6 that includes a mobile radio network as mentioned above.

The executable access confirmation module 23 comprises computer program code configured to control a processor of the respective mobile device 2 such that it executes various functions as described later in more detail. In an embodiment, the executable access confirmation module 23 is implemented as a so called applet and comprises interpretable computer program code for a virtual machine, e.g. Java code configured to run on a Java virtual machine (Java is a registered trademark by Sun Microsystems, Inc.).

Figure 3:
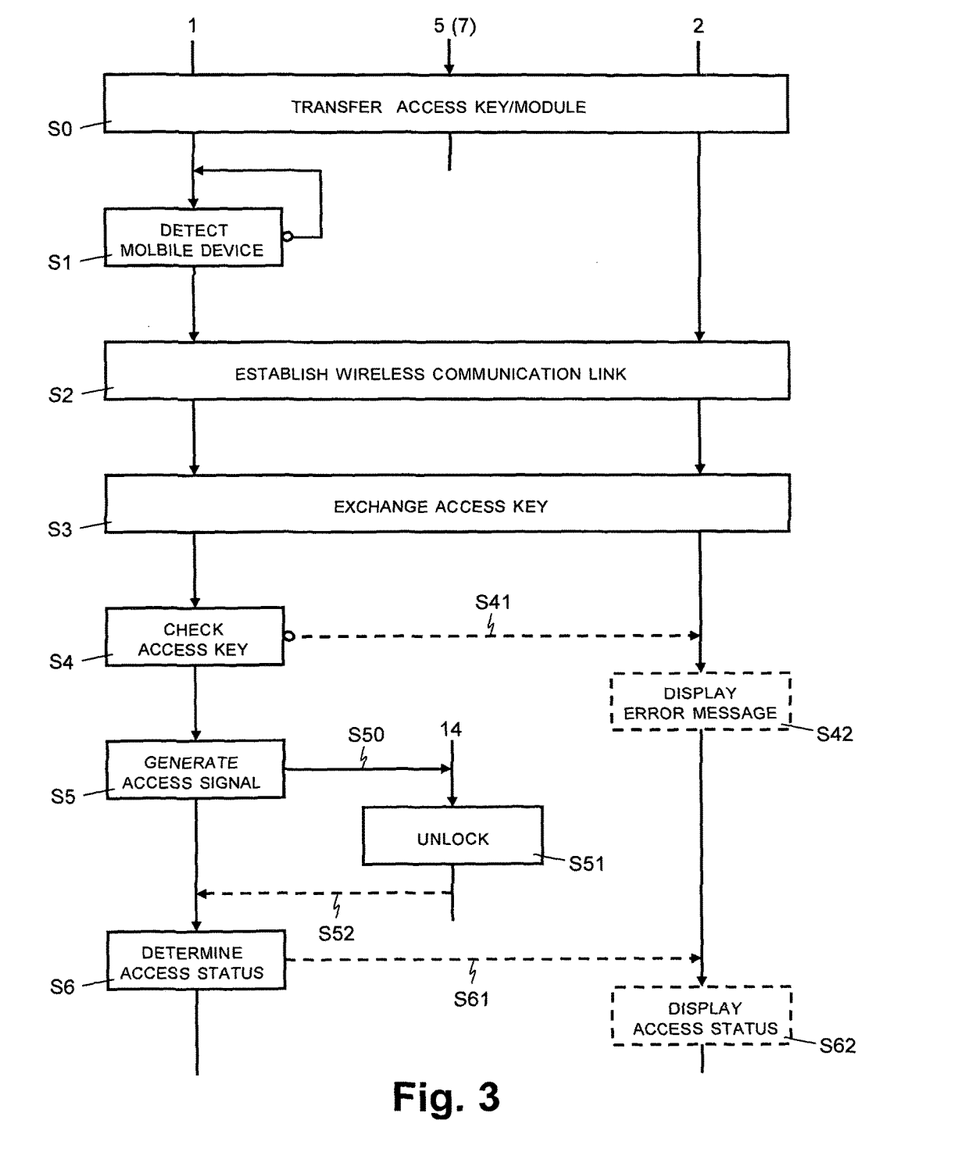
FIG. 3: shows a flow diagram illustrating an exemplary sequence of steps for electronic access control.
Figure 4:
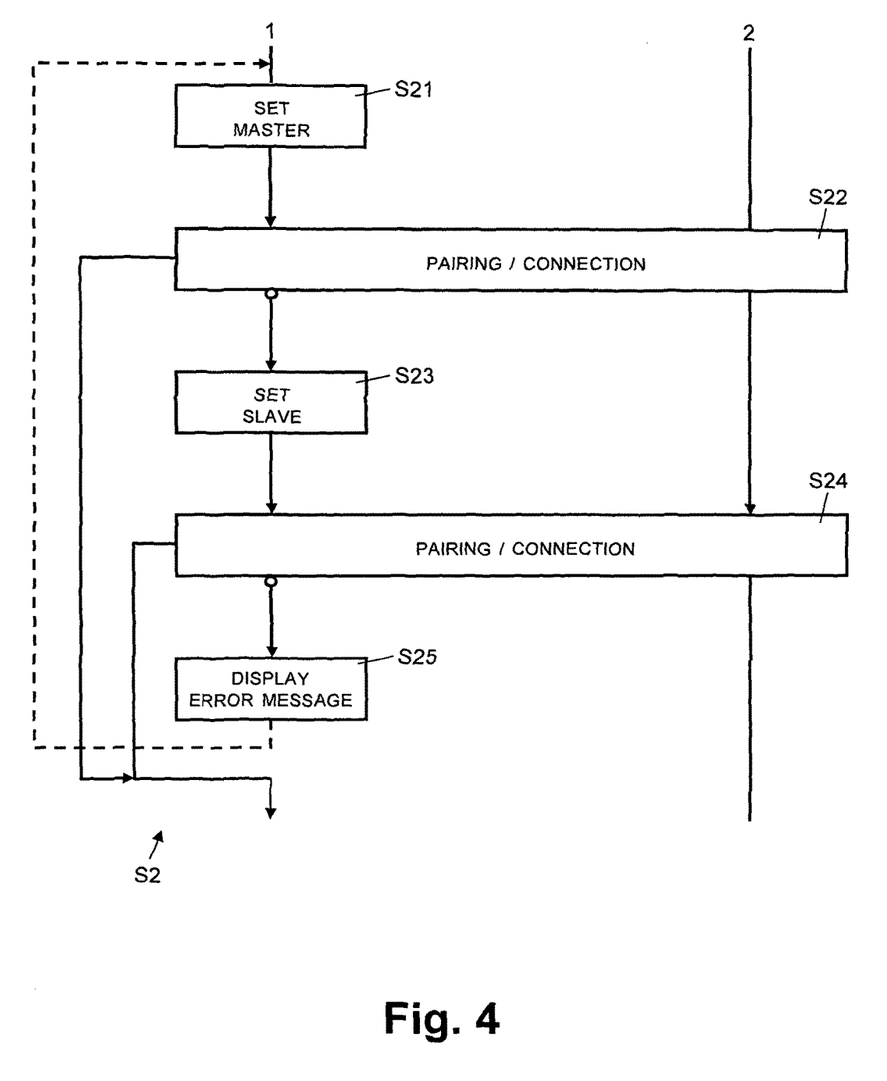
FIG. 4: shows a flow diagram illustrating an exemplary sequence of steps for establishing a direct wireless communication link between an electronic access control device and a mobile device.
Figure 5:
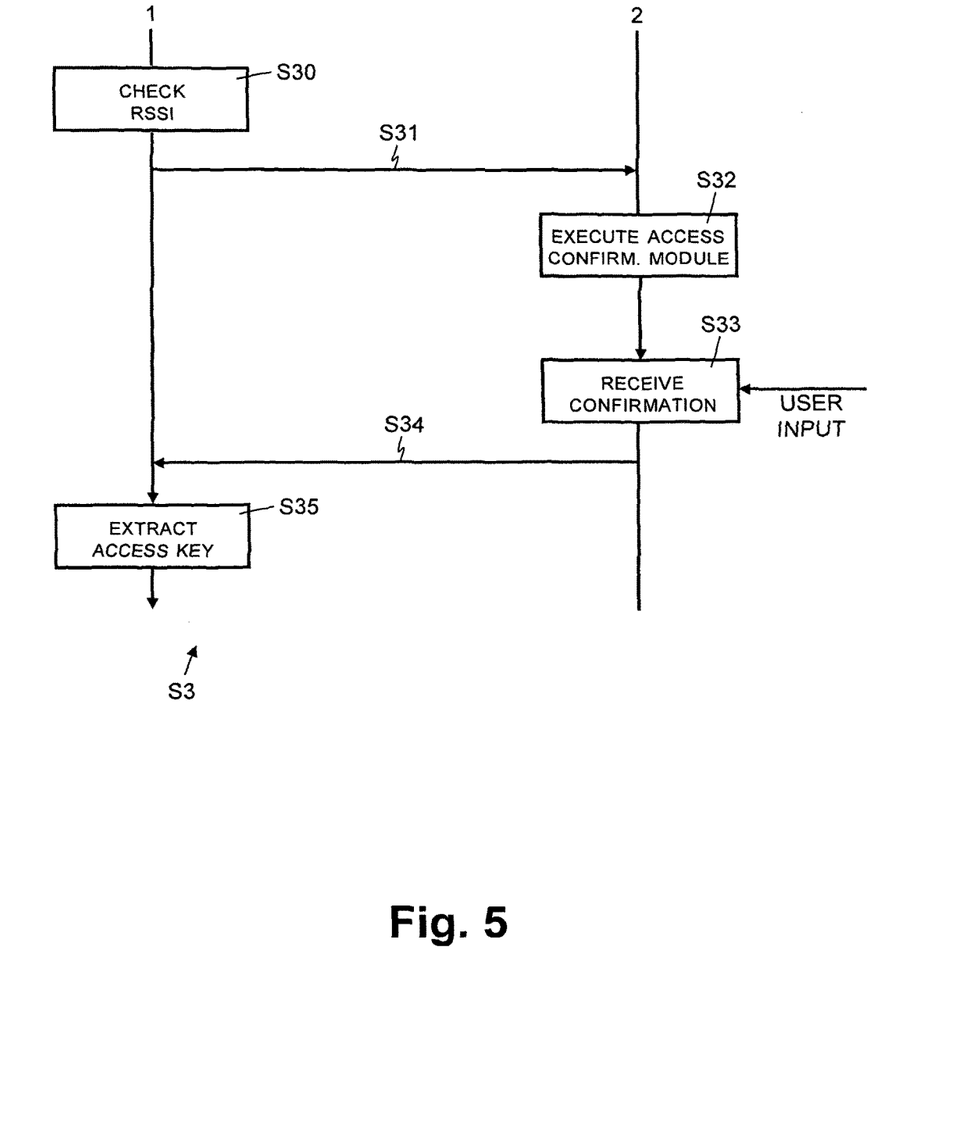
FIG. 5: shows a flow diagram illustrating an exemplary sequence of steps for transmitting an access key from a mobile device to an electronic access control device.

In the following paragraphs, described with reference to FIGS. 3-5 are possible sequences of steps for electronic access control, performed by the functional modules of the access control device 1, the mobile device 2, and the access rights server 5.

In preparatory step S0, the access right server 5 transfers to the mobile device 2 an access key for accessing an area with controlled access, controlled by the access control device 1. The access key is transferred securely, e.g. via Transport Layer Security (TLS), Secure Sockets Layer (SSL), or other cryptographic protocols for secure data communication. In an embodiment the access key is transferred to the mobile device 2 via an NFC interface, a Bluetooth interface, or a Bluetooth beacon. For example, for transmitting the access key to the mobile device 2, an NFC terminal is installed on a counter or desk of the hotel reception, or the Bluetooth terminal (interface) or Bluetooth beacon is installed in the reception area of the hotel, respectively. Depending on the embodiment and configuration, the access right server 5 further transfers the access key or cryptographic elements for verifying the access key to the respective access control device 1. Alternatively, the access key or the cryptographic elements, respectively, are stored in the access control device 1 prior to being transferred to the mobile device 2. For example, the access key is an encrypted secret (e.g. a secret access authorization code) and the access control device 1 uses a secret decryption key to verify the secret.

In an embodiment, the access right server 5 further transfers to the mobile device 2 the executable access confirmation module 23 mentioned above. In a further embodiment, the access key is transferred to the mobile device as part of the executable access confirmation module 23.

For example, in case of a hotel application, the access key and, if applicable, the executable access confirmation module 23 are transmitted to the mobile devices 2 during the checking in procedure at the reception.

In step S1, the access control device 1 or its proximity detector 13, respectively, detects the presence of the mobile device 2 in defined (close) proximity P of the access control device 1. For that purpose, the user of the mobile device 2 physically moves and places the mobile device 2 into the defined (close) proximity range P of the access control device 2 or the antenna 131 of its proximity detector 13, respectively.

In step S2, upon detection of the mobile device 2 in defined (close) proximity P to the access control device 1 or its proximity detector 13, respectively, the controller 12 of the access control device 1 controls the radio communication module 11 to establish a direct wireless communication link 3 with the mobile device 2.

In the embodiment illustrated in FIG. 4, in step S21, the access control device 1 or its controller 12, respectively, control the radio communication module 11 to act as a master for establishing the direct wireless communication link 3. Specifically, the controller 12 sets the Bluetooth transceiver of the radio communication module 11 in Bluetooth central mode.

In step S22, the radio communication module 11 performs a connection process; specifically, the Bluetooth transceiver initiates a Bluetooth connection process and scans for Bluetooth slaves. If successful, the access control device 1 and the mobile device 2 or their radio communication modules 11, 21, respectively, establish the direct wireless communication link 3 as a Bluetooth connection. As one skilled in the art will understand, with Bluetooth (BT), the establishment of a connection uses a preceding pairing process, whereas Bluetooth Low Energy (BTLE) does not include a pairing process.

Otherwise, the controller 12 proceeds in step S23 by controlling the radio communication module 11 to act as a slave for letting the mobile device 2 establish the direct wireless communication link 3. Specifically, the controller 12 sets the Bluetooth transceiver of the radio communication module 11 in Bluetooth peripheral mode.

In step S24, the mobile device 2 or its radio communication module 21, respectively, performs the connection process; specifically, the Bluetooth transceiver of the mobile device 2 initiates a Bluetooth connection process and scans for Bluetooth slaves. If successful, the mobile device 2 and the access control device 1 or their radio communication modules 11, 21, respectively, establish the direct wireless communication link 3 as a Bluetooth paired connection and proceed to step S3.

Otherwise, in step S25, the access control device 2 displays an error message, e.g. indicating to the user that, before repeating the process, the communication module 21 of the mobile device 2 should be activated. In a further embodiment, in cases where the mobile device 2 can be associated with the respective access control device 1, the access control device 1 requests the access right server 5 to send to the user of the mobile device 2 a similar error message.

In an embodiment, for increased versatility, upon detection of the mobile device 2 in defined (close) proximity P to the access control device 1 or its proximity detector 13, respectively, the controller 12 of the access control device 1 is configured to select, from different types of radio communication module implemented in the access control device 1, a preferred radio communication module for establishing the direct wireless communication link 3 with the mobile device 2. Specifically, the controller 12 is configured to select the Bluetooth transceiver or the WLAN communication module as described above, or an NFC interface, e.g. implemented in the RFID reader of the proximity detector 13 described above. Depending on the embodiment or configuration, the selection of the preferred radio communication module is performed by the controller 12 using a preference table, stored in the access control device 1, or according to programmable selection rules, defining the priority or order in which the access control device 1 selects the radio communication module for establishing the direct wireless communication link 3 with the mobile device 2.

In step S3, once the direct wireless communication link 3 is set up between the mobile device 2 and the access control device 1 or their radio communication modules 11, 21, respectively, the mobile device 2 or its radio communication module 21, respectively, transfers the access key via the direct wireless communication link 3 to the access control device 1. Specifically, the access confirmation module 23 is executed and controls the processor 22 of the mobile device 2 to transfer the access key to the access control device 1. Execution of the access confirmation module 23 is triggered once the direct wireless communication link 3 is set up between the mobile device 2 and the access control device 1 or their radio communication modules 11, 21, respectively. In an embodiment, execution of the access confirmation module 23 is triggered by the access control device 1 transmitting an execution request via the direct wireless communication link 3 to the mobile device 2.

As illustrated in FIG. 5, in step S33, the mobile device 2 or the access confirmation module 23 requests and receives from the user of the mobile device 2 a confirmation instruction, e.g. prior to or after transferring the access key to the access control device 1. Depending on the embodiment, the access confirmation module 23 generates and displays on a display of the mobile device 2 a graphical user interface, e.g. a "cancel" and an "ok" button, for the user to confirm the intended access to the area controlled by the access control device 1. In an embodiment, the user is required to enter authorization information, such as an access code or password. Alternatively or in addition, the access confirmation module 23 uses a fingerprint sensor of the mobile device 2 to receive an affirmative confirmation from the user.

In step S34, if the user has entered the required confirmation instruction, e.g. by successfully pressing the "ok" button and/or the fingerprint sensor, the access confirmation module 23 generates a confirmation message which, in an embodiment, includes the access key. The confirmation message, and, if included, the access key, is transferred from the mobile device 2 via the direct wireless communication link 3 to the access control device 1. In an alternative embodiment, the access key and the confirmation message are transferred to the access control device 1 separately from each other.

In step S35, access control device 1 or its controller 12, respectively, receives the confirmation message from the radio communication module 11 via the direct wireless communication link 3. In the embodiment where the access key is included in the confirmation message, the controller 12 extracts the access key from the confirmation message received from the mobile device 1.

Steps S30, S31, S32 make it possible to load and install the access confirmation module 23 in the mobile device 2, without the need to preload and preinstall the access confirmation module 23 in the mobile device 2, but to load and install the access confirmation module 23 dynamically when the mobile device 2 is detected within defined (close) proximity of the access control device 1. As illustrated in FIG. 5, the controller 12 checks whether the Received Signal Strength Indicator (RSSI) indicates a signal strength of the mobile device 2 or its radio communication module 21, respectively, that corresponds to a defined close range C of distance from the access control device 1, e.g. a maximum distance of mobile device 2 from the access control device 1 of half a meter, one meter, or two meters, e.g. adjustable by setting a distance parameter in the access control device 1. If the RSSI values is above the set signal strength threshold and the mobile device 2 is thus located within the defined close range C of distance from the access control device 1, in step S31, the controller 12 uses the radio communication module 11 to transfer the access confirmation module 23 via the direct wireless communication link 3 to the mobile device 2. One skilled in the art will understand, that in cases where the mobile device 2 is configured to measure the signal strength, the controller 12 may perform the signal strength test of step S30 using the value of the signal strength as measured by and received from the mobile device 2. In a further embodiment, the controller 12 sets the radio communication module 11 to an initial first low transmission power, corresponding to a defined close range C of distance from the access control device 1, where transmissions from the access control device 1 are assumed to by receivable for the mobile device 2. Subsequently, it the access control device 1 does not receive any response from the mobile device 2 within a set response time, the controller 12 increases the transmission power to an increased second transmission power, corresponding to an extension of the close range C of distance.

In step S32, the processor 22 of the mobile device 2 receives and executes the access confirmation module 23. The access confirmation module 23 requests from the user of the mobile device 2 a confirmation instruction, e.g. by displaying a respective request on a display of the mobile device 2 asking the user to press a confirmation button and/or place a finger on a finger print sensor, depending on the configuration and/or embodiment.

As described above, in step S33, the access confirmation module 23 receives from the user of the mobile device 2 the confirmation instruction, e.g. via a graphical user interface and/or a finger print sensor. If the confirmation is affirmative, e.g. the user pressed the "ok" button or the finger print sensor read and verified the user's finger print as legitimate (authorized), the access confirmation module 23 generates an affirmative confirmation message which, in an embodiment, includes the access key, e.g. in encrypted form as previously received from the access rights server 5.

In an embodiment, the controller 12 and/or the access confirmation module 23 imposes certain conditions that need to be met by the access confirmation module 23 in order for the confirmation message to be transmitted to the access control device 1 or in order for the confirmation message to be accepted by the access control device 1. For example, the access confirmation module 23 needs to be of a certain type, manufacturer, and/or version number; the access confirmation module 23 needs to be running as a foreground application on the mobile device 2; and/or the access confirmation module 23 needs transmit the confirmation message to the access control device 1 within a defined scanning time after the access control device 1 having initiated connection establishment. Accordingly, the access confirmation module 23 is configured to include in the confirmation message a module identifier that identifies the access confirmation module 23, e.g. with regards to its type, manufacturer, and/or version number, and the controller 12 checks whether the received module identifier identifies an access confirmation module 23 that is supported by the access control device 1, e.g. whether the received module identifier indicates a supported type, manufacturer, and/or version number of access confirmation module 23. For ensuring that the access confirmation module 23 is presently running as a foreground application on the mobile device 2, the access confirmation module 23 checks whether it is presently running as a foreground application on the mobile device 2 and either includes the result of this checking in the confirmation message for the controller 12 to check, or it does not generate the confirmation message, if the access confirmation module 23 is not presently running as a foreground application on the mobile device 2.

In a further embodiment, the controller 12 dynamically adapts the level of the set signal strength threshold for the performing the signal strength test of step S30. For example, the controller 12 decreases the set signal strength threshold to a lower value, if it receives confirmation messages from more than one mobile device 2 within a defined scanning time (e.g. a response time window of 200 ms).

As illustrated in FIG. 3, in step S4, the controller 12 checks and verifies the access key received from the mobile device 2. Depending on the embodiment, the controller 12 decrypts the received access key and compares the decrypted access key to a verification key stored in the access control device 1. One skilled in the art will understand that there are various cryptographic functions and algorithms for verifying an access key and that the different levels and types of access rights may be associated with a particular access key, e.g. permitted access dates and/or time periods. In any case, steps S0-S4 provide an end-to-end encryption of the access key or secret access authorization between the access rights server 5 and the access control device 1.

In optional step S41, if the access key cannot be properly verified, the controller 12 uses the radio communication module 11 to transfer an error message via the direct wireless communication link 3 to the mobile device 2.

In optional step S42, the processor 22 of the mobile device 2 receives the error message and renders it on the mobile device 2, e.g. by displaying it on a display of the mobile device 2 and/or generating an acoustic alarm on the mobile device 2.

In step S5, responsive to a positive verification of the received access key, the controller 12 generates an access control signal, e.g. in form of an electrical signal or a data value. Depending on the embodiment and/or configuration, the access control signal represents an unlock command which is different and distinguishable form a lock command.

In step S50, the controller 12 applies the access control signal to the electronic lock 14, e.g. via an electrical signal line or a data register connected or accessible to the electronic lock 14.

In step S51, responsive to the access control signal from the controller 12, the electronic lock 14 performs an unlocking function, e.g. it drives a bar or bolt to mechanically unlock a door, gate, or the like to clear access through an entrance to an access controlled area, e.g. a building or a room, such as a hotel room.

In optional step S52, the electronic lock 14 returns to the controller 12 an unlock confirmation or unlocked status signal, e.g. in form of an electrical signal or a data value.

In step S6, the controller 12 determines and defines an access status that corresponds to and reflects the access control signal. For example, the access status indicates an "open" state, corresponding to an unlock command, or a "closed" state, corresponding to a lock command. In the embodiment that includes optional step S52, the controller 12 determines and defines the access status using the unlock confirmation or unlocked status signal from the electronic lock 14.

In optional step S61, the controller 12 uses the radio communication module 11 to transfer an access status message, which includes the access status, via the direct wireless communication link 3 to the mobile device 2.

In optional step S62, the processor 22 of the mobile device 2 receives the access status message and displays the access status on a display of the mobile device 2.

In a further aspect, the proximity detector 13 comprises, in addition or as an alternative, a capacitive sensor 130 configured to detect the presence of a user in a defined proximity P to the electronic access control device 1, e.g. in a defined proximity P of 0-5 centimeters, e.g. 2-3 centimeters or 2-5 centimeters. Specifically, the capacitive sensor 130 is configured to detect the presence of a user's hand in the defined proximity P to the electronic access control device 1. For example, the capacitive sensor 130 is a Capsense MBR3 sensor from Cypress (Capsense is registered trademark of Cypress Semiconductor Corp.), e.g. a Capsense MBR3 sensor CY8CMBR3108. For example, the capacitive sensor 130 is electrically connected to a metal door handle or to an antenna arranged close to the door handle or a marked area of the entrance to the access controlled area. In this embodiment, the controller 12 is connected to the proximity detector 13 or the capacitive sensor 130, respectively, and is further configured to control the radio communication module 11 to establish the direct wireless communication link 3 with the mobile device 2, upon detection of the user by the proximity detector 13 in the defined proximity P of the electronic access control device 1. The controller 12 is further configured to check and verify, as an additional second condition for establishing the direct wireless communication link 3, that the received signal strength of the mobile device 2, as indicated by the radio communication module 11 or a measurement received from the mobile device 2, meets a defined threshold value which indicates that the mobile device 2 is within a defined maximum distance from the access control device 1. For example, the controller 12 is configured to control the radio communication module 11 to establish the direct wireless communication link 3 with the mobile device 2, only if the user is detected in a defined proximity of 0-5 centimeters from the electronic access control device 1 and if the received signal strength of the mobile device 2, as indicated by the radio communication module 11, is at or above a defined threshold value that indicates a maximum distance of the mobile device 2 of 0.5 or 1 meter from the access control device 1.

In an embodiment, two or more access control devices 1 share one radio communication module 11. For example, in a hotel scenario, the access control devices 1 of two neighboring hotel rooms are connected to a common radio communication module 11 which is installed externally to (door-side mounted) housings of the two access control devices 1, e.g. in the ceiling with approximately equal or at least similar distance to the two access control devices 1 (in a ceiling-side housing). The external radio communication module 11 is connected through a wired connection to the access control devices 1 or their controllers 12, respectively. As described above with reference to step S2, upon detection of the mobile device 2 by the proximity detector 13 in defined proximity P of one of the electronic access control devices 1, the respective controller 12 of that electronic access control device 1 controls the external radio communication module 11 to establish a direct wireless communication link 3 with the mobile device 2. For that purpose, the controller 12 transmits to the external radio communication module 11 a detection signal. Alternatively, the external radio communication module 11 establishes a direct wireless communication link 3 with the mobile device 2, regardless of a detection signal from the access control device 1, while the detection signal enables the external radio communication module 11 to identify the particular access control device 1 that effectively detected the mobile device 1 in defined proximity P. Subsequently, operation continues in step S3 as described above with reference to FIGS. 3 and 5. In an alternative scenario and configuration, the external radio communication module 11 is connected through the wired connection to one access control device 1 that has two or more antennas 131, whereby each of the antennas 131 is associated with a different door or its electronic lock 14, respectively. In this alternative configuration, the controller 12 determines the electronic lock 14 to be opened based on the antenna 131 through which the mobile device 2 was detected by the proximity detector 13 in defined proximity P of the electronic access control device 1 or the particular antenna 131, respectively. The communication between the external radio communication module 11 and the mobile device takes place as described above.

It should be noted that, in the description, the computer program code has been associated with specific functional modules and the sequence of the steps has been presented in a specific order, one skilled in the art will understand, however, that the computer program code may be structured differently and that the order of at least some of the steps could be altered, without deviating from the scope of the invention.

The invention claimed is:

1. An electronic access control device comprising:
a radio communication module configured to perform a wireless data exchange with a mobile device over a direct wireless communication link between the radio communication module and the mobile device;
an access confirmation module implemented as an applet comprising computer program code executable on a processor of the mobile device, the computer program code being configured to control the processor of the mobile device to receive from a user of the mobile device a confirmation instruction and to transmit to the radio communication module of the access control device a confirmation message responsive to the confirmation instruction; and
a controller connected to the radio communication module and configured to control the radio communication module to transmit the access confirmation module via the direct wireless communication link to the mobile device, and, upon reception of a confirmation message from the mobile device via the direct wireless communication link, to generate an access control signal.

2. The access control device of claim 1, wherein the access confirmation module is further configured to control the processor of the mobile device to include in the confirmation message an access key; and the controller is further configured to generate the access control signal using the access key included in the confirmation message.

3. The access control device of claim 1, wherein the controller is further configured to check whether a signal strength of the mobile device is above a signal strength threshold indicative of the mobile device being located within a defined close range of distance from the access control device, and to transfer the access confirmation module via the direct wireless communication link to the mobile device, if the signal strength of the mobile device is above the signal strength threshold.

4. The access control device of claim 1, wherein the controller is further configured to control the radio communication module to transmit to the mobile device the executable access confirmation module configured to control the processor of the mobile device to receive the confirmation instruction from the user of the mobile device through at least one of: a finger print sensor of the mobile device and a graphical user interface of the mobile device.

5. The access control device of claim 1, wherein the controller is further configured to control the radio communication module to transmit to the mobile device the executable access confirmation module configured to control the processor of the mobile device to perform at least one of: verifying authorization information entered by the user and verifying of a finger print entered by the user through a finger print sensor of the mobile device; and, upon affirmative verification, to generate an affirmative confirmation message which includes the access key.

6. The access control device of claim 1, wherein the radio communication module is configured to perform the wireless data exchange with the mobile device in a first radio frequency band; and the electronic access control device further comprises a proximity detector configured to detect a presence of the mobile device in defined proximity of the electronic access control device using a radio frequency in a second radio frequency band different from the first radio frequency band; and the controller is connected to the proximity detector and further configured to control the radio communication module to establish the direct wireless communication link with the mobile device, upon detection of the mobile device by the proximity detector in the defined proximity of the electronic access control device.

7. The access control device of claim 6, wherein the radio communication module is configured to perform the wireless data exchange with the mobile device over a short distance communication link of several meters, particularly over a distance of up to ten meters; and the proximity detector is configured to detect the presence of the mobile device in close proximity of the electronic access control device of a few centimeters, particularly within a distance of up to ten centimeters.

8. The access control device of claim 6, wherein the proximity detector comprises an RFID reader and is configured to detect the presence of the mobile device by emitting an electromagnetic field pulse, detecting a return signal during emission of the electromagnetic field pulse, and using the return signal to detect the presence of the mobile device.

9. The access control device of claim 1, wherein the radio communication module comprises a Bluetooth transceiver, and the controller is further configured to control the Bluetooth transceiver to establish the direct wireless communication link with the mobile device by performing a Bluetooth connection process.

10. The access control device of claim 1, wherein the access control device further comprises an electronic lock, and the controller is connected to the electronic lock and further configured to supply the access control signal to the electronic lock for controlling the electronic lock to perform an unlock function.

11. The access control device of claim 1, wherein the controller is further configured to define an access status reflective of the access control signal, and to control the radio communication module to transmit the access status to the mobile device.

12. A mobile device comprising:
a radio communication module configured to perform a wireless data exchange with an access control device over a direct wireless communication link between the radio communication module and the access control device; and
a processor connected to the radio communication module and configured to control the radio communication module to receive from the access control device, via the direct wireless communication link, an executable access confirmation module implemented as an applet comprising computer program code executable on the processor of the mobile device and configured to control the processor of the mobile device to receive from a user of the mobile device a confirmation instruction and, responsive to the confirmation instruction, to transmit a confirmation message via the direct wireless communication link to the access control device, enabling the access control device to generate an access control signal.

13. An access control method, the method comprising:
controlling by a controller of an electronic access control device a radio communication module of the electronic access control device to establish with a mobile device a direct wireless communication link for a wireless data exchange;
transmitting an executable access confirmation module from the access control device via the direct wireless communication link to the mobile device, the executable access control module being implemented as an applet comprising computer program code;
executing the computer program code of the executable access confirmation module by a processor of the mobile device; and
the computer program code of the executable access confirmation module controlling the processor of the mobile device such that the processor receives from a user of the mobile device a confirmation instruction, generates a confirmation message, responsive to the confirmation instruction, and transmits the confirmation message via the direct wireless communication link to the radio communication module of the access control device, enabling the access control device to generate an access control signal.

14. The method of claim 13, wherein the method further comprises the executable access confirmation module controlling the processor of the mobile device such that the processor includes in the confirmation message an access key stored in the mobile device, enabling the access control device to generate the access control signal using the access key.

15. The method of claim 14, wherein the method further comprises the controller of the electronic access control device checking whether a signal strength of the mobile device is above a signal strength threshold indicative of the mobile device being located within a defined close range of distance from the access control device, and transferring the access confirmation module via the direct wireless communication link to the mobile device, if the signal strength of the mobile device is above the signal strength threshold.

16. The method of claim 14, wherein the method further comprises detecting by a proximity detector of the electronic access control device a presence of the mobile device in defined proximity of the electronic access control device using a radio frequency in a second radio frequency band; and the controller of the electronic access control device controlling the radio communication module of the electronic access control device to establish the direct wireless communication link with the mobile device in a first radio frequency band different than the second radio frequency band, upon detection of the mobile device by the proximity detector in the defined proximity of the electronic access control device.

\* \* \* \* \*